United States Patent
Jackson et al.

(10) Patent No.: US 7,239,493 B2
(45) Date of Patent: Jul. 3, 2007

(54) METHOD FOR PREVENTING THE GENERATION OF EXCESSIVE HIGH VOLTAGE

(75) Inventors: David Ross Jackson, Indianapolis, IN (US); Angela Renee Burnett, Indianapolis, IN (US); Michael Maiorano, Villingen-Schwenningen (DE); Charles Hardinge, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 424 days.

(21) Appl. No.: 10/421,505

(22) Filed: Apr. 23, 2003

(65) Prior Publication Data
US 2003/0202301 A1    Oct. 30, 2003

(30) Foreign Application Priority Data
Apr. 24, 2002    (EP)    ................................... 02009136

(51) Int. Cl.
H02H 9/00    (2006.01)
(52) U.S. Cl. ..................................... 361/91.1; 361/100
(58) Field of Classification Search .................. 361/86, 361/91.1, 91.2, 91.5, 56, 78, 100
See application file for complete search history.

(56) References Cited

U.S. PATENT DOCUMENTS 5,561,578 A * 10/1996 Shimoyanagida .......... 361/91.2
6,075,687 A *  6/2000 Cheng et al. ............... 361/91.1
6,282,071 B1 *  8/2001 Jackson ....................... 361/86

FOREIGN PATENT DOCUMENTS

EP    1098427 A1    5/2001
WO    WO01/41454    6/2001

* cited by examiner

Primary Examiner—Stephen W. Jackson
(74) Attorney, Agent, or Firm—Joseph J. Laks; Harvey D. Fried; Sammy S. Henig

(57)    ABSTRACT

Method for preventing a high voltage circuit form generating excessive high voltage, wherein the method comprises the following steps:
a) reading a digital representation of a reference value associated with one of a plurality of operation modes stored in a memory;
b) verifying the integrity of the representation of the reference value;
c) providing a sensed signal representing the output voltage of the high voltage circuit;
d) comparing the sensed signal with the reference value;
e) inhibiting the generation of the high voltage output if the comparison in step (d) indicates excessive high voltage.

10 Claims, 3 Drawing Sheets

METHOD FOR PREVENTING THE GENERATION OF EXCESSIVE HIGH VOLTAGE

This application claims the benefit under 35 U.S.C. § 365 of European patent application No. 02009136.9 filed Apr. 24, 2002.

FIELD OF THE INVENTION

The present invention is related to a method and a device for preventing a high voltage circuit from generating excessive high voltage.

Television products or computer displays, which incorporate CRTs, are subject to strict legal regulations regarding the emission of X-radiation.

BACKGROUND OF THE INVENTION

CRTs emit visible light by striking phosphors on the faceplate with electrons and transferring the electron's kinetic energy to light, heat, and other forms of energy, e.g., X-radiation. The frequency spectrum of photon emission is a property of the phosphor material. Besides the type of target material, the probability of emission of a photon of X-ray frequency depends on the accelerating potential (anode voltage) and the number of electrons striking the phosphor in a unit of time ("anode current" or "beam current").

In high performance television receivers and computer displays, the perceived light output is a function of the amount of beam current and high voltage power. In such receivers and monitors, it is desirable to set the operating point as high as possible, while strictly complying with X-ray protection regulations. Frequently, when component tolerances are considered, the high voltage operating point must be lower than desired to ensure the protection circuit will always trip at acceptable levels, but will not activate in normal operation, or during transients, such as channel change.

Each model of CRT has an individual maximum acceleration voltage and beam current that corresponds to a maximum allowable X-radiation emission. In many television receivers and computer displays, the anode current for "normal operation" is adjusted to always be below a maximum, worst case current, ensuring the legal regulation regarding the maximum allowable X-radiation emission is not violated. Since, at any possible operating point, and under any possible fault condition, no television or computer display instrument is allowed to emit X-radiation in excess of published limits, many television receivers and computer displays using CRTs contain "X-ray protection circuits", or XRPs. In FIG. 1, the curve (1) for maximum allowable acceleration voltage for a television receiver model is illustrated as a function of the beam current. The television receiver has a high voltage circuit tolerance of 2.5 kV and an X-ray protection circuit tolerance of 2.3 kV is illustrated. Curves 2, 3 and 4 show the nominal, upper and lower trip voltages of the XRP circuit, respectively, and curves 5, 6 and 7 show the nominal, upper and lower voltages of the high voltage transformer, respectively, resulting from the component tolerances. To establish compliance with legal requirements, the nominal operating high voltage is set approximately 9.5 kV below the maximum value. The tolerance in the high voltage circuit may be reduced by selection of precision components. High voltage tolerance may be nearly eliminated by measuring the high voltage and providing a feedback loop to regulate the high voltage. These methods, although expensive and not well suited for mass production, have been used in television receiver and video monitor design.

One type of XRP causes the television picture to become "not viewable" when a fault is detected. One method to achieve this is to force the horizontal scan frequency high, resulting in a picture that "rolls". The disadvantage of this method is that the television receiver continues to operate with the fault present.

Another, more recent type of XRP interrupts the horizontal deflection. In televisions and monitors where the High Voltage transformer is an integral part of the deflection yoke scan current, turning off the horizontal deflection may result in ceasing generation of the high voltage, which is the accelerating potential for the electron beam, as mentioned above. In recent television receivers, the video and color processing, audio, sync separator, and timing signals for the horizontal and vertical deflection, are commonly contained in an Integrated Circuit, or chipset. Such so-called "One-Chips" often have an "X-Ray Protection" pin, which, when activated, removes the drive to the horizontal deflection. While stopping the horizontal deflection has the advantage of removing the source of the electrical field that allows acceleration of the electron beam, it may be difficult to implement, in practice. Because of the interest in larger receivers and monitors, and more light output, the horizontal scan circuitry is required to operate under a wide range of load conditions. One way to drive the horizontal scan more efficiently is to provide feedback regarding the load to the horizontal drive section. This "proportional drive" concept increases the base drive to the horizontal output switch when the load current is increased. The horizontal scan circuit, however, is a resonant circuit, by nature, and may continue to try to oscillate, even at very low drive levels. If no distinct "X-Ray protection" that stops the horizontal deflection is incorporated, it may, in the event of a fault, be difficult to remove the horizontal drive completely.

In order to activate in the event of excess X-radiation, many XRP circuits monitor an "image" of the anode voltage. Typically, an additional winding on the high voltage transformer generates this image, which follows, by virtue of magnetic coupling, the high voltage at the anode of the CRT at a fixed ratio determined by the number of windings. The additional or "X-Ray Protection" winding voltage may be rectified and compared to a reference to determine whether or not a fault has occurred. If the "XRP voltage" is below a reference level, the television instrument is assumed to be in normal operation. If the "image-voltage" representing the anode voltage exceeds a set reference level, which indicates exceeding of the admissible high voltage, or the rate of X-rays emitted by the CRT, the X-ray protection circuit must cause the instrument to cease "normal operation".

One method to compensate for XRP circuit tolerances mentioned above is to add a variable resistor, or potentiometer, to adjust either the reference voltage to the XRP circuit, or the "image voltage" generated in the additional winding. During production alignment, the scan supply may be increased until the target high voltage for XRP circuit activation is reached. The potentiometer is then adjusted until the XRP output changes its state, indicating a fault has occurred. However, using potentiometers may cause many problems. As a mechanical device, it is subject to contamination, vibration, thermal expansion and contraction, and aging. Often, to reduce the chance the alignment will be changed adhesives or protective cases are used.

Another method to reduce the effects of circuit tolerances is disclosed in U.S. Pat. No. 6,075,687, issued Jun. 13, 2000, to Cheng et al. The method presented in Cheng uses sampling and converting to digital of a rectified "image voltage", generated in an additional winding. A microprocessor periodically polls the digital value of the voltage corresponding to the high voltage from the analog to digitized converter and compares the result with a high and a low limit, stored in memory, which have been calibrated during production alignment. On crossing any of the upper or lower limits, the microprocessor issues a signal, cutting off the power supply to the high voltage transformer.

An "open loop" method of reducing the high voltage tolerance during production alignment is to adjust the feedback of the power supply, which energizes the primary winding of the high voltage, until the desired target value of high voltage is obtained. This alignment method, however, may increase the tolerance in any other secondary supplies for other circuits.

SUMMARY OF THE INVENTION

It is desirable to provide a CRT display X-ray protection method, which overcomes the problems of large tolerances, avoids the susceptibility to environmental influences and aging, allows for simple alignment and adjustment during manufacturing and ensures safe cut-off of high voltages generating X-radiation.

According to the invention a method for preventing a high voltage circuit form generating excessive high voltage is provided, wherein the method comprises the following steps:

a) reading a digital representation of a reference value associated with one of a plurality of operation modes stored in a memory;

b) verifying the integrity of the representation of the reference value;

c) providing a sensed signal representing the output voltage of the high voltage circuit;

d) comparing the sensed signal with the reference value;

e) inhibiting the generation of the high voltage output if the comparison in step (d) indicates excessive high voltage. It is an advantage of the invention that corrupted data cannot cause any hazardous situation in particular with regard to X-ray protection. The present invention routinely verifies that the stored X-ray protection data is valid.

Advantageous embodiments of the inventive method are subject to subclaims. The advantages are: The impact of circuit tolerances is reduced, environmental effects are reduced, separate alignments are possible for each supported operating frequency and detection of alignment faults is possible.

DETAILED DESCRIPTION OF PREFERRED EMBODIMENTS

Figure 1:
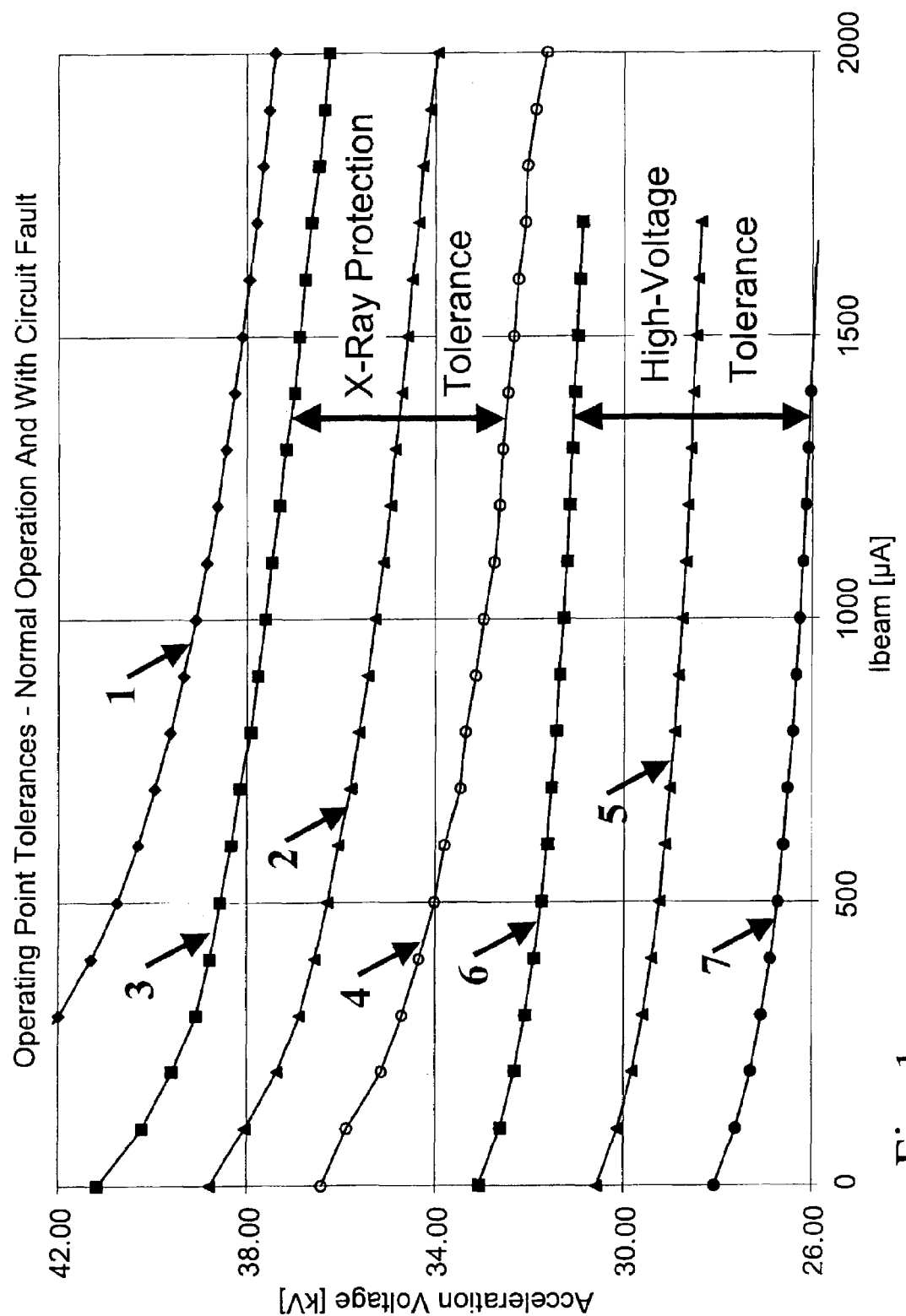
FIG. 1 shows the operating point tolerances of the high voltage generator and the X-ray protection circuit for an exemplary high voltage circuit built according the state of the art, along with the maximum allowable acceleration voltage for an exemplary model of CRT.
Figure 2:
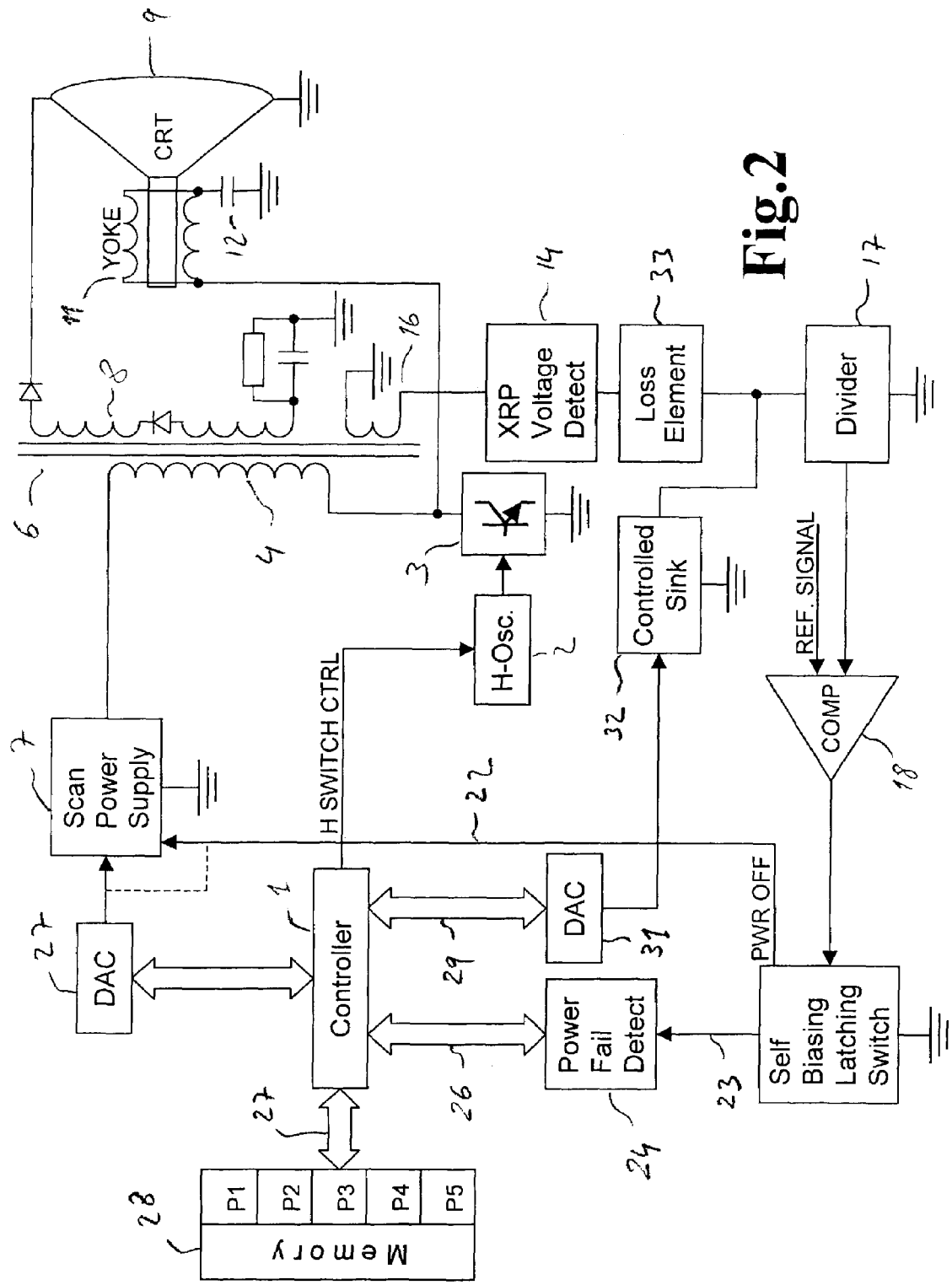
FIG. 2 shows a block diagram of a display incorporating a CRT and the high voltage circuit according to the invention.

FIG. 2 shows in a simplified schematic diagram a TV receiver or a computer monitor having a CRT. A controller 1 is controlling a horizontal oscillator 2 for generating a drive signal for the horizontal scanning switch 3. Horizontal scanning switch 3 is connected to one end of a primary winding 4 of a high voltage transformer 6. The other end of the primary winding 4 is connected to a scan power supply 7. By switching the horizontal scan switch 3, a high voltage is generated in the secondary winding 8 of high voltage transformer 6. The high voltage is connected to the cathode ray tube (CRT) 9 in order to supply an accelerating potential for the electron beam issued by the anode electrode of the CRT (not shown). The electron beam passes through a magnetic field, generated by a yoke 11 and controlled by the horizontal switch 3, and is thereby deflected in a raster scanning way. Yoke 11 is connected to a retrace capacitor 12 at one end, and at the other end is connected to the horizontal scanning switch 3. A voltage detecting circuit 14 is connected to a tertiary winding 16 of the transformer 6 and a signal divider 17, which presents at its output a signal that is fed to one input of a signal comparator 18. A reference signal 19 is fed to a second input of comparator 18. The output signal of comparator 18 is input to a self-biasing latching switch 21. It is assumed that the high voltage transformer 6 generates at its tertiary winding 16 a high voltage proportional to the ratio of the secondary and tertiary winding. Therefore, by detecting the voltage across the tertiary winding 16, information about the high voltage at the secondary winding 8 is derived. The reference signal is compared to the signal representing the high voltage at the tertiary winding 16 of high voltage transformer 6. On exceeding the reference value, the signal comparator's output changes its state, thus actuating the self-biasing latching switch 21. The self-biasing latching switch 21 is in a first point connected to an on-off control line 22 to the power supply and immediately inhibits operation of the power supply by applying a latched signal to the control line accordingly. The horizontal oscillator 2 for generating a drive signal for the horizontal scanning switch 3 keeps actuating the switch 3 and thereby discharges the energy stored in the power supply 7 and the high voltage from the secondary winding 8 of transformer 6 and the associated components. A second connection 23 issues a latched signal to power fail detect circuit 24, signaling a fault condition. The controller 1 periodically polls the status of the power fail detect circuit via bus connection 26 and, on detecting a fault condition, after a determined time inhibits the operation of the horizontal scanning switch 3 by controlling the means 2 for generating a drive signal accordingly. In the sequence following to an XRP failure, controller 1 removes the power to the self-biasing latching switch, allowing the switch to reset, and resets all other components and power supplies for a restart. In the case of immediate re-occurrence of the XRP failure, the controller may inhibit further operation of the display device. In order to restart the display device, controller 1 resets the power supplies and other components in the circuit and causes the power on-off control line 22 to go low, thus removing the self-biasing current from the latching switch 21.

In order to make the so far described high voltage circuit adaptable to different operating modes of one type of CRT or to different types of CRTs, the controller 1 manipulates the signal provided by the divider 17 to the comparator 18.

The controller 1 reads via a bus line 27 control data associated with an operating mode from a memory 28. In the memory 28, multiple instances of a set of reference values are stored in different locations, often referred to as pages, shown in the drawing as P1 ... P5 of memory 28. In order to ensure safe retrieval of the data from the memory, even in case of a physical failure in some cells of the memory 28, the pages may be located in different physical areas in the memory 28.

The controller 1 transfers the control data via a bus line 29 to a digital-to-analog-converter 31. The analog output signal of the DAC 31 controls a current sink 32, which determines in cooperation with a loss element 33 the level of the input signal of the divider 17. In this way, different switching levels of the comparator are selectable even though the reference signal remains unchanged.

Figure 3:
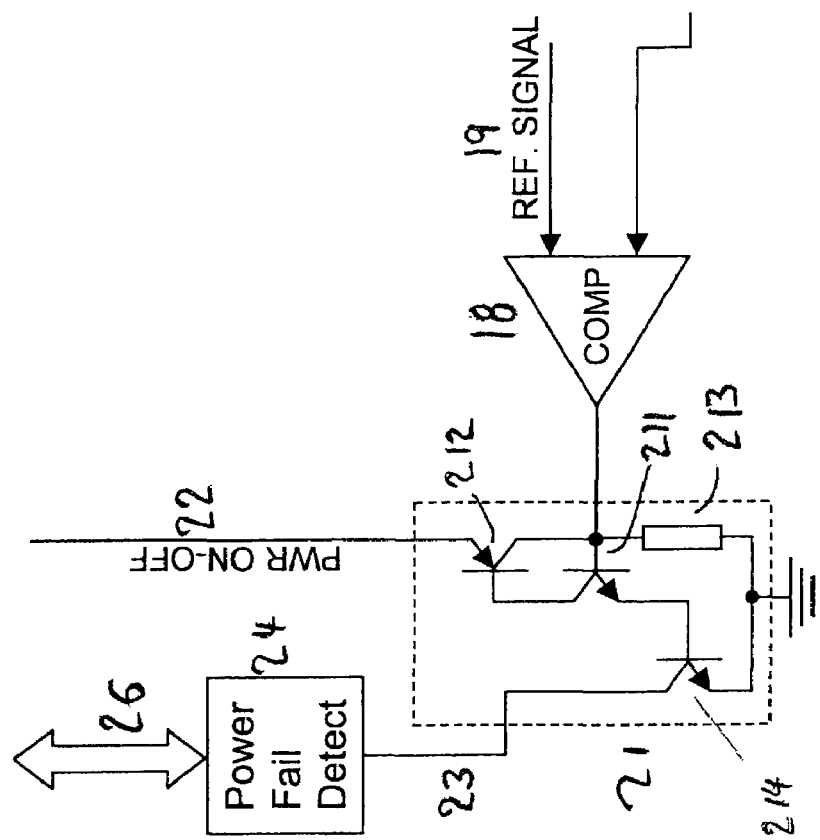
FIG. 3 shows a detailed view of a portion of the inventive circuit shown in FIG. 2

FIG. 3 shows a part of a preferred embodiment of the inventive circuit from FIG. 2 in a zoomed view. In this embodiment, in case of an excess high voltage, comparator 18 issues a signal having a voltage sufficient to forward-bias the base-emitter diode of transistor 211 and establishing a conducting path from the collector electrode to the emitter electrode of transistor 211. Thereby, a current path is established allowing a control current to forward-bias transistor 212. This, in turn, establishes a current flow from the emitter electrode to the collector electrode of transistor 212, drawing a current from the on-off control line 22 from the power supply 7 and thereby inhibiting the power supply. The current flowing establishes a voltage across resistor 213, which is sufficient to keep transistor 211 conducting, even if the signal from comparator 18 is removed. The current through base-emitter diode of transistor 212 and collector-emitter path of transistor 211 switches transistor 214 to a conducting state. This, in turn, grounds connection 26 to the power fail detect circuit 24. Controller 1 cyclic polls the state of the power fail detect circuit 24, and after controlled de-energizing the high voltage from the secondary winding 8 of the high voltage transformer 6, inhibits the horizontal scanning switch 3 by accordingly controlling drive signal generator 2.

In another preferred embodiment, if the power supply does not feature a dedicated on-off control input, the power on-off line 22 may be used to drive the voltage control signal 27, e.g., from DAC 28, low, as indicated by the dashed line in FIGS. 2 and 3, thus disabling the power supply 7.

In connection with the described circuit it is important to consider that the data read from memory 28 could be corrupted. In order to avoid any hazardous events in such a case the integrity of the data read from memory 28 is verified. With electronic alignment, faults may occur randomly within the storage device or all locations may fail over time. According to one embodiment of the inventive method a checksum algorithm is applied onto the data. In the case of an isolated, random failure, the checksum algorithm is guaranteed to always detect a minimum of one fault. Depending on the nature of multiple faults, the algorithm will detect multiple faults as well.

It is expected that when all locations within the storage device fail, they will fail in the same manner, resulting in all locations containing the same value. There are two special cases that must be addressed. The storage device may contain all zeros or all ones due to a fault for the entire storage device or due to failure to program the device initially. The checksum algorithm will always generate a checksum of a different value than each of the individual alignments. Therefore, a fault will be detected if all alignment locations contain the same value as the checksum. This characteristic of the alignment will guarantee that devices that were never programmed or devices that fail such that the same value (typically zero or one) is stored in every location will be detected and no X-Rays will be emitted.

Additional measures are taken to ensure the integrity of the alignment values. The alignment locations, once written, are read-only, preventing tampering with the locations. The alignment values are not stored in contiguous locations. This benefits error detection by ensuring that if the storage device fails for only a block of memory, that either the alignment data or the checksum integrity is maintained, and that the fault would appear to be a random, isolated one that is easily detected by the algorithm. Finally, knowledge of the range limits for the alignment data allows each individual alignment to be verified prior to use. Therefore, even if multiple faults have occurred in such a way that the calculated checksum equals the stored checksum, a fault will still be detected because the content of the individual alignment location is not valid.

In another embodiment of the inventive method several instances of the same data are read to verify the integrity of the data. The DAC-output value block is stored at five locations in the memory 28, using five different pages. A read access for a single block has to always be done twice and the value is only valid if both reads return the same values without error.

A block has the following structure:
Bits 76543210

| Bits | 76543210 | |
|---|---|---|
| Byte 1 | PPDDDDDD | P means odd parity, stored twice |
| Byte 2 | DDDDDDPP | D is the 6 bit value of the DAC register |
| Byte 3 | ppdddddd | p means even parity, stored twice |
| Byte 4 | ddddddpp | d is the complement of the 6 bit value |

The 6 bit value is stored four times in the block at different bit positions. Each time, the remaining two bits are filled with a parity bit. A block is defined corrupt if one or more parity bits are wrong or if the four decoded DAC values are not all identical.

If one or two corrupted blocks (out of five blocks in total) are detected, the remaining four or three correct blocks are used to correct the block(s) containing errors. The check is done before the deflection is started.

If more than two blocks are corrupt the TV stays in Stand-By mode, storing and blinking an error code. The NVM values of register DAC-output have to be reset to 00H. Thus it will be no more possible to start the deflection, because with DAC-value 00H the protection (threshold is below value of signal XRP under normal operation) is always active immediately after starting the horizontal drive.

What is claimed is:

1. Method for preventing a high voltage circuit from generating excessive high voltage, wherein the method comprises the following steps:
    reading a digital representation of a reference value associated with one of a plurality of operation modes stored in a memory;
    verifying the integrity of the read representation of the reference value;
    providing a sensed signal representing the output voltage of the high voltage circuit;
    comparing the sensed signal with the reference value;
    inhibiting the generation of the high voltage output if said comparing indicates excessive high voltage.

2. Method according to claim 1, comprised of reading a respective digital representation of different reference values for different operating modes.

3. Method according to claim 1, comprised of verifying the integrity of the representation of the reference value by applying a checksum algorithm.

4. Method according to claim 3, comprised of applying the checksum algorithm to each representation of all stored reference values.

5. Method according to claim 1, comprised of reading at least two different stored representations of a single reference value to verify the integrity of the representation of the reference value.

6. Method according to claim 1, comprised of verifying the integrity of the representation of the reference value by comparing the read reference value with stored upper boundary limits.

7. Method according to claim 1, comprised of verifying the integrity of the representation of the reference value by comparing the read reference value with stored lower boundary limits.

8. Method for preventing a high voltage circuit from generating excessive high voltage, wherein the method comprises:
  reading a digital representation of a reference value associated with one of a plurality of operation modes stored in a memory;
  verifying the integrity of the read representation of the reference value;
  developing a fault indication signal upon detecting a corrupted representation of a reference value;
  providing a sensed signal representing the output voltage of the high voltage circuit;
  comparing the sensed signal with the reference value; and
  inhibiting the generation of the high voltage output if said comparing indicates excessive high voltage.

9. Method for preventing a high voltage circuit from generating excessive high voltage, wherein the method comprises:
  reading a digital representation of a reference value associated with one of a plurality of operation modes stored in a memory;
  verifying the integrity of the read representation of the reference value;
  providing a sensed signal representing the output voltage of the high voltage circuit;
  comparing the sensed signal with the reference value;
  inhibiting the generation of the high voltage output if said comparing indicates excessive high voltage; and
  reconstructing a corrupted representation of a reference value from another uncorrupted representation of the same reference value.

10. Method according to claim 9, comprised of reconstructing a corrupted representation of a reference value from a plurality of uncorrupted representations of the same reference value.

* * * * *